United States Patent
Stachniak et al.

(10) Patent No.: US 11,875,027 B2
(45) Date of Patent: Jan. 16, 2024

(54) CONTEXTUAL USER INTERFACE

(71) Applicant: MICROSOFT TECHNOLOGY LICENSING, LLC, Redmond, WA (US)

(72) Inventors: Szymon Piotr Stachniak, Redmond, WA (US); Kenneth Alan Lobb, Sammarnish, WA (US); Mario Esposito, Redmond, WA (US); Clinton Chi-Wen Woon, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/361,522

(22) Filed: Mar. 22, 2019

(65) Prior Publication Data
US 2019/0220181 A1 Jul. 18, 2019

Related U.S. Application Data

(60) Division of application No. 14/856,281, filed on Sep. 16, 2015, now Pat. No. 10,248,301, which is a
(Continued)

(51) Int. Cl.
*G06F 3/04847* (2022.01)
*G06F 3/041* (2006.01)
(Continued)

(52) U.S. Cl.
CPC ........ *G06F 3/04847* (2013.01); *A63F 13/213* (2014.09); *A63F 13/235* (2014.09);
(Continued)

(58) Field of Classification Search
CPC .... G06F 3/04847; G06F 9/451; G06F 3/0412; G06F 3/03547; G06F 3/04883;
(Continued)

(56) References Cited

U.S. PATENT DOCUMENTS

| 5,516,105 A | * | 5/1996 | Eisenbrey | ............... A63F 13/06 |
| | | | | 273/148 B |
| 6,256,019 B1 | * | 7/2001 | Allport | ............ H04N 21/42204 |
| | | | | 345/169 |

(Continued)

OTHER PUBLICATIONS

"Final Office Action Issued in U.S. Appl. No. 16/018,583", dated Apr. 26, 2019, 12 Pages.
(Continued)

*Primary Examiner* — Tuyetlien T Tran

(57) ABSTRACT

Embodiments of the present invention analyze a context in which a user interacts with a computer interface and automatically optimizes the interface for the context. The controller or control mode the user selects for interaction may define the context, in part. Examples of control modes include gesturing, audio control, use of companion devices, and use of dedicated control devices, such as game controllers and remote controls. The different input devices are designed for different tasks. Nevertheless, a user will frequently attempt to perform a task using a control input that is not adapted for the task. Embodiments of the present invention change the characteristics of the user interface to make it easier for the user to complete an intended task using the input device of the user's choice.

20 Claims, 14 Drawing Sheets

Related U.S. Application Data continuation of application No. 13/725,925, filed on Dec. 21, 2012, now Pat. No. 9,170,667.

(60) Provisional application No. 61/654,638, filed on Jun. 1, 2012.

(51) Int. Cl.

| | | |
|---|---|---|
| *G06F 3/033* | (2013.01) | |
| *G06F 3/0354* | (2013.01) | |
| *G06F 3/04883* | (2022.01) | |
| *G06F 9/451* | (2018.01) | |
| *A63F 13/213* | (2014.01) | |
| *G06V 40/20* | (2022.01) | |
| *H04L 65/403* | (2022.01) | |
| *G06F 3/048* | (2013.01) | |
| *H04N 21/4722* | (2011.01) | |
| *G06F 3/01* | (2006.01) | |
| *A63F 13/235* | (2014.01) | |
| *A63F 13/493* | (2014.01) | |
| *A63F 13/812* | (2014.01) | |
| *G06F 3/0484* | (2022.01) | |
| *A63F 13/50* | (2014.01) | |
| *H04N 21/41* | (2011.01) | |
| *H04N 21/845* | (2011.01) | |
| *H04L 65/401* | (2022.01) | |
| *H04N 21/478* | (2011.01) | |
| *G06F 16/48* | (2019.01) | |
| *G06F 40/169* | (2020.01) | |

(52) U.S. Cl.
CPC ............ *A63F 13/493* (2014.09); *A63F 13/50* (2014.09); *A63F 13/812* (2014.09); *G06F 3/011* (2013.01); *G06F 3/017* (2013.01); *G06F 3/033* (2013.01); *G06F 3/03547* (2013.01); *G06F 3/041* (2013.01); *G06F 3/048* (2013.01); *G06F 3/0412* (2013.01); *G06F 3/0484* (2013.01); *G06F 3/04883* (2013.01); *G06F 9/451* (2018.02); *G06V 40/20* (2022.01); *H04L 65/403* (2013.01); *H04N 21/4722* (2013.01); *G06F 16/489* (2019.01); *G06F 40/169* (2020.01); *H04L 65/4015* (2013.01); *H04N 21/4122* (2013.01); *H04N 21/4781* (2013.01); *H04N 21/8455* (2013.01)

(58) Field of Classification Search
CPC ........ G06F 3/017; G06F 3/0484; G06F 3/048; G06F 3/011; G06F 3/041; G06F 3/033; G06F 40/169; G06F 16/489; G06F 3/01; G06F 9/44; A63F 13/50; A63F 13/235; A63F 13/493; A63F 13/812; A63F 13/06; G06K 9/00335; H04L 65/403; H04L 65/4015; H04N 21/4722; H04N 21/4781; H04N 21/4122; H04N 21/8455
See application file for complete search history.

(56) References Cited

U.S. PATENT DOCUMENTS

| | | | | |
|---|---|---|---|---|
| 6,709,330 B1* | 3/2004 | Klein | ............... | A63F 13/005 463/9 |
| 8,255,006 B1* | 8/2012 | Chavez | ............ | H04M 1/72569 455/567 |
| 8,464,160 B2* | 6/2013 | Sakata | ............... | G06F 3/0481 715/750 |
| 8,745,154 B1* | 6/2014 | Froment | ............ | H04L 67/306 709/217 |
| 8,760,426 B1* | 6/2014 | Strand | ............... | G06F 1/1686 345/173 |
| 8,880,623 B2 | 11/2014 | Mcintosh et al. | | |
| 8,965,986 B1* | 2/2015 | Acharya | ............ | H04M 15/844 709/206 |
| 9,265,450 B1* | 2/2016 | Giobbi | ............... | A61B 5/1113 |
| 9,342,139 B2* | 5/2016 | Adermann | ............ | G06F 3/033 |
| 9,703,940 B2* | 7/2017 | Forbes | ............... | G06F 21/00 |
| 10,701,447 B2 | 6/2020 | Meyer | | |
| 2002/0065566 A1* | 5/2002 | Aronson | ............ | G07F 17/3244 700/91 |
| 2002/0065715 A1 | 5/2002 | Tennyson et al. | | |
| 2003/0003991 A1* | 1/2003 | Kuraishi | ............... | A63F 13/213 463/30 |
| 2003/0028390 A1* | 2/2003 | Stern | ............ | G06Q 30/06 705/1.1 |
| 2003/0046401 A1* | 3/2003 | Abbott | ............... | G06F 9/451 709/228 |
| 2004/0019292 A1* | 1/2004 | Drinan | ............ | G06K 9/00362 600/547 |
| 2004/0155962 A1* | 8/2004 | Marks | ............ | G06T 7/50 348/169 |
| 2007/0130399 A1* | 6/2007 | Anderson | ............ | G08C 17/02 710/62 |
| 2007/0298882 A1* | 12/2007 | Marks | ............... | A63F 13/219 463/36 |
| 2008/0165255 A1* | 7/2008 | Christie | ............ | G06F 3/04883 348/207.99 |
| 2008/0267447 A1* | 10/2008 | Kelusky | ............ | G06F 19/3481 382/100 |
| 2009/0017853 A1* | 1/2009 | Ozog | ............... | H04M 11/022 455/509 |
| 2009/0048021 A1* | 2/2009 | Lian | ............ | G06F 3/011 463/37 |
| 2009/0055739 A1* | 2/2009 | Murillo | ............... | G06F 9/451 715/708 |
| 2009/0199098 A1* | 8/2009 | Kweon | ............ | H04N 21/47214 715/716 |
| 2009/0228841 A1* | 9/2009 | Hildreth | ............... | G06F 3/0304 715/863 |
| 2009/0244003 A1* | 10/2009 | Bonnat | ............... | G06F 3/011 345/157 |
| 2010/0142924 A1 | 6/2010 | Yamashita et al. | | |
| 2010/0272420 A1 | 10/2010 | Soohoo et al. | | |
| 2010/0277411 A1* | 11/2010 | Yee | ............ | G06K 9/00912 345/156 |
| 2010/0277489 A1* | 11/2010 | Geisner | ............ | A63F 13/65 345/581 |
| 2010/0303289 A1* | 12/2010 | Polzin | ............ | A63F 13/428 348/135 |
| 2010/0317332 A1* | 12/2010 | Bathiche | ............... | H04B 1/202 455/418 |
| 2011/0001813 A1* | 1/2011 | Kim | ............ | G06K 9/00355 348/77 |
| 2011/0007079 A1* | 1/2011 | Perez | ............ | H04N 21/4532 345/473 |
| 2011/0034129 A1* | 2/2011 | Kim | ............... | G06F 9/451 455/41.3 |
| 2011/0106736 A1* | 5/2011 | Aharonson | ....... | H04M 1/72586 706/12 |
| 2011/0107369 A1 | 5/2011 | O'brien et al. | | |
| 2011/0134030 A1* | 6/2011 | Cho | ............ | G06F 3/0488 345/157 |
| 2011/0175810 A1* | 7/2011 | Markovic | ............ | G06F 3/011 345/158 |
| 2011/0275358 A1* | 11/2011 | Faenger | ............ | H04W 8/24 455/420 |
| 2011/0279368 A1* | 11/2011 | Klein | ............... | A63F 13/655 345/158 |
| 2011/0280403 A1* | 11/2011 | DeLuca | ............... | H04L 67/16 380/278 |
| 2011/0310002 A1* | 12/2011 | Tidemand | ............ | A63F 13/06 345/156 |

(56) References Cited

U.S. PATENT DOCUMENTS

| | | | | |
|---|---|---|---|---|
| 2012/0014558 | A1* | 1/2012 | Stafford | H04N 5/23229 382/103 |
| 2012/0028625 | A1* | 2/2012 | Konig | H04M 1/72552 455/418 |
| 2012/0151320 | A1 | 6/2012 | Mcclements et al. | |
| 2012/0166177 | A1* | 6/2012 | Beld | G06F 40/20 704/9 |
| 2012/0268360 | A1* | 10/2012 | Mikhailov | A61B 5/1172 345/156 |
| 2012/0276994 | A1* | 11/2012 | Lansdale | A63F 13/213 463/31 |
| 2012/0302340 | A1* | 11/2012 | Takemoto | A63F 13/533 463/31 |
| 2013/0013991 | A1 | 1/2013 | Evans | |
| 2013/0019192 | A1* | 1/2013 | Itoh | G06F 3/0346 715/765 |
| 2013/0031462 | A1* | 1/2013 | Calvo | G06F 9/545 715/234 |
| 2013/0109369 | A1* | 5/2013 | Forutanpour | H04M 1/72577 455/418 |
| 2013/0215116 | A1 | 8/2013 | Siddique et al. | |
| 2013/0239041 | A1* | 9/2013 | DaCosta | G06F 3/04886 715/773 |
| 2014/0067946 | A1 | 3/2014 | Bruich et al. | |
| 2014/0306877 | A1* | 10/2014 | Katz | G06T 7/70 345/156 |

OTHER PUBLICATIONS

"Office Action Issued in Korean Patent Application No. 10-2014-7037015", dated Sep. 4, 2019, 9 Pages.
"Office Action Issued in Canadian Patent Application No. 2,874,667", dated Mar. 1, 2019, 3 Pages.
"Second Screen", Retrieved from: https://en.wikipedia.org/w/index.php?title=Second_screen&oldid=533430314, Jan. 16, 2013, 4 Pages.
"XEP-0174: Serverless Messaging", Retrieved from: https://web.archive.org/web/20121105155947if_/https://xmpp.org/extensions/xep-0174.html, Nov. 5, 2012, 24 Pages.
"Summons to Attend Oral Proceedings Issued in European Patent Application No. 14703967.1", Mailed Date: Feb. 18, 2020, 9 Pages.
"Office Action Issued in Indian Patent Application No. 8333/CHENP/2014", dated Feb. 21, 2020, 7 Pages.
"Office Action Issued in Brazilian Patent Application No. BR112014029915.3", dated Jan. 3, 2020, 5 Pages.
"Extended European Search Report Issued in European Patent Application No. 20150793.6", dated Apr. 24, 2020, 8 Pages.
"Final Office Action Issued in U.S. Appl. No. 16/018,583", dated Apr. 16, 2020, 16 Pages.
"Non Final Office Action Issued in U.S. Appl. No. 16/018,583", dated Aug. 3, 2020, 10 Pages.
"Non-Final Office Action Issued in U.S. Appl. No. 16/018,583", dated Oct. 9, 2019, 13 Pages.
"Office Action Issued in European Patent Application No. 20150793.6", dated Dec. 22, 2020, 7 Pages.

* cited by examiner

CONTEXTUAL USER INTERFACE

CROSS-REFERENCE TO RELATED DOCUMENTS

This application is a divisional of U.S. patent application Ser. No. 14/856,281, filed Sep. 16, 2015, and titled "Contextual User Interface," which is a continuation of U.S. Pat. No. 9,170,667, filed Dec. 21, 2012, and titled "Contextual User Interface," which claims the benefit of priority to U.S. Provisional Application No. 61/654,638, filed Jun. 1, 2012, and titled "Companion Experiences", the entirety of which are hereby incorporated by reference.

BACKGROUND

User interfaces for televisions, game consoles, media players, personal computers, and other devices have become increasingly complex. Devices have more and more applications and programs through which users can access an ever-expanding amount of content. Additionally, users have a variety of mechanisms for interacting with the interfaces. An interface adapted for one form of interaction may not be suitable or optimized for a second kind of interaction.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention analyze a context in which a user interacts with a computer interface and automatically optimizes the interface for the context. The controller or control mode the user selects for interaction may define the context, in part. Examples of control modes, include gesturing, audio control, use of companion devices, and use of dedicated control devices, such as game controllers and remote controls. The different input devices are designed for different tasks. Nevertheless, a user will frequently attempt to perform a task using a control input that is not adapted for the task. Embodiments of the present invention change the characteristics of the user interface to make it easier for the user to complete an intended task using the input device of the user's choice.

In addition to adapting the interface to the chosen interaction mechanism, interfaces can be additionally optimized based on environmental conditions. Environmental conditions include the location of a person relative to other people and objects in the room as well as the content displayed on the one or more interface. For example, an interactive menu could be presented on part of a screen that is not being blocked by an object or person standing between the screen and the user who is trying to interact with the content on the screen. Thus, if the bottom right corner of the screen was blocked by a person, then help information would be presented on a different part of the screen. Similarly, if a user has a phone or other object in their right hand, then a gesture-based menu may be optimized for use with a left hand. For example, the menu objects may be moved to the left-hand side of the screen so that the user does not have to reach across their body to virtually select the interface objects.

Embodiments of the present invention may use various signals to ascertain the present context. Exemplary signals include color image data gathered from a camera, 3D image data gathered from a depth camera or other 3D-capable acquisition device, audio signals, and state information from one or more computing devices and controllers in the vicinity.

BRIEF DESCRIPTION OF THE DRAWINGS

Embodiments of the invention are described in detail below with reference to the attached drawing figures, wherein.

DETAILED DESCRIPTION

Figure 1:
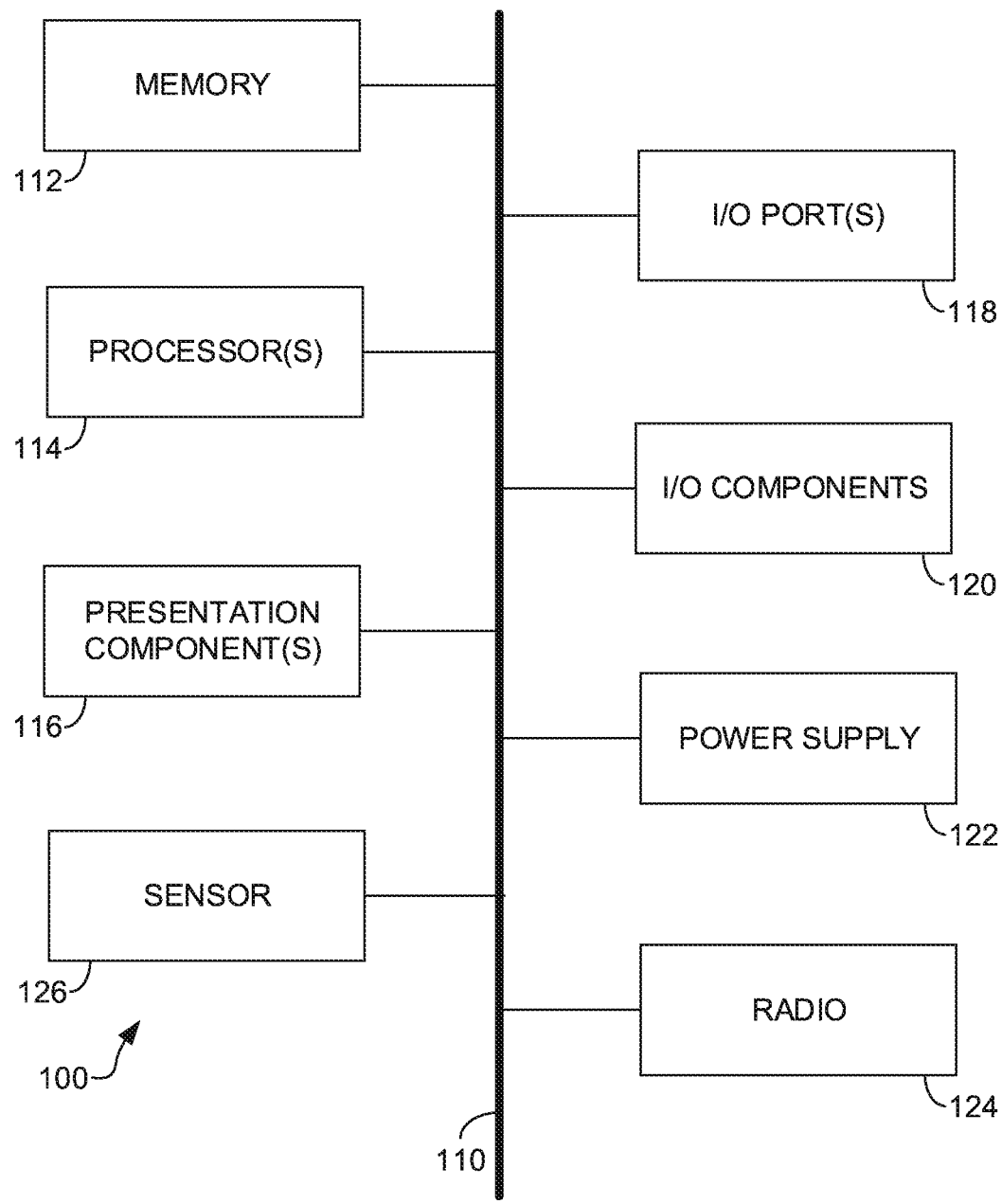
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention analyze a context in which a user interacts to interact with a computer interface and automatically optimizes the interface for the context. User interactions with a user interface may include giving different degrees of attention to the interface ranging from ignoring the interface to complete attention. The controller or control mode the user selects for interaction may define the context, in part. Examples of control modes, include gesturing, audio control, use of companion devices, and use of dedicated control devices, such as game controllers and remote controls. The different input devices are designed for different tasks. Nevertheless, a user will frequently attempt to perform a task using a control input that is not adapted for the task. Embodiments of the present invention change the characteristics of the user interface to make it easier for the user to complete an intended task using the input device of the user's choice.

In addition to adapting the interface to the chosen interaction mechanism, interfaces can be additionally optimized based on environmental conditions. Environmental conditions include the location of a person relative to other people and objects in the room as well as the content displayed on the one or more interface. For example, an interactive menu could be presented on part of a screen that is not being blocked by an object or person standing between the screen and the user who is trying to interact with the content on the screen. Thus, if the bottom right corner of the screen was blocked by a person, then help information would be presented on a different part of the screen. Similarly, if a user has a phone or other object in their right hand, then a gesture-based menu may be optimized for use with a left hand. For example, the menu objects may be moved to the left-hand side of the screen so that the user does not have to reach across their body to virtually select the interface objects.

Embodiments of the present invention may use various signals to ascertain the present context. Exemplary signals include color image data gathered from a camera, 3D image data gathered from a depth camera or other 3D-capable acquisition device, audio signals, and state information from one or more computing devices and controllers in the vicinity.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Multi-Device User Experience

Figure 2:
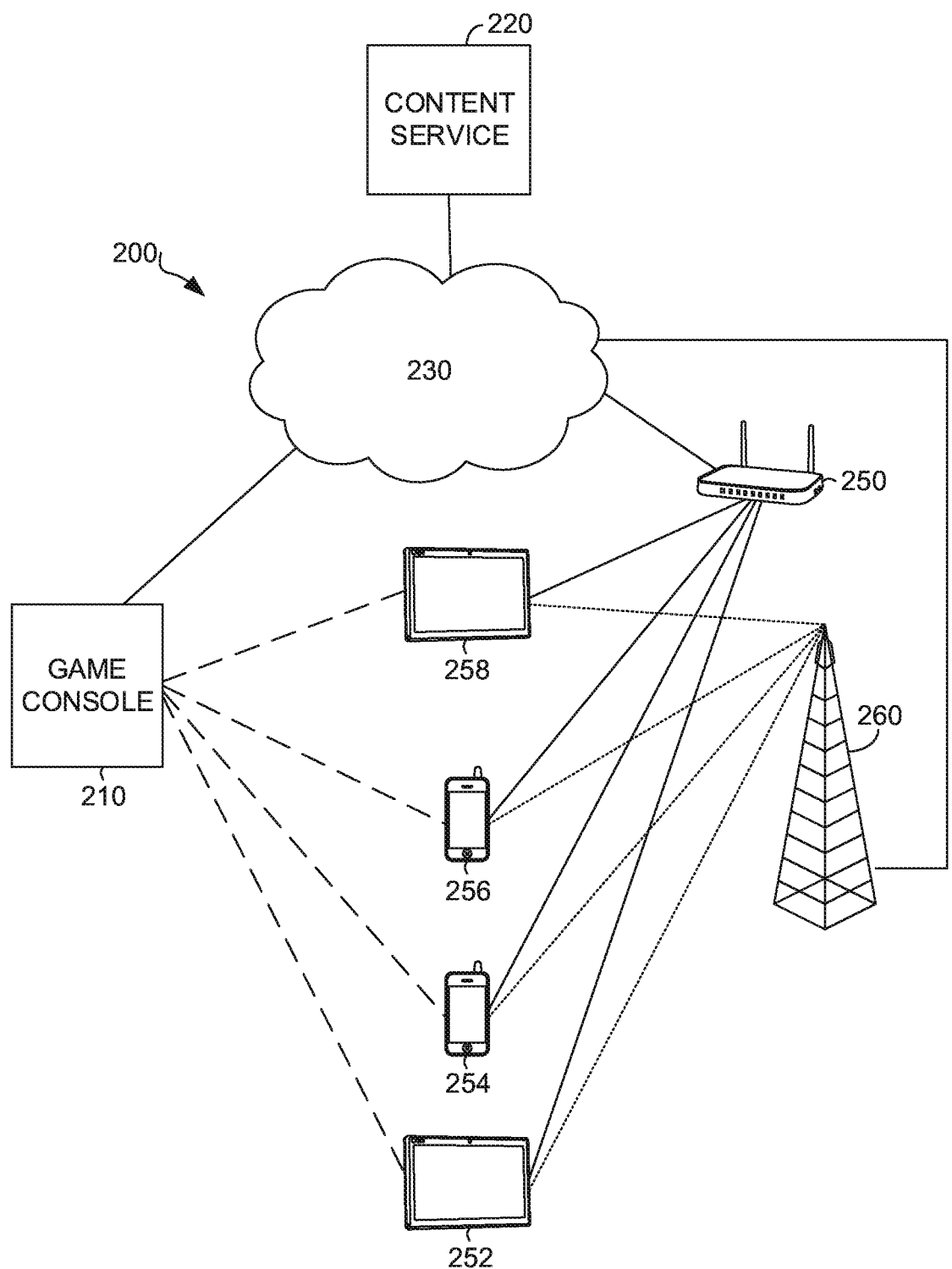
FIG. 2 is a diagram illustrating a variety of communication mediums between game consoles, game services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, or other suitable computing device that presents titles. Titles may be games, movies, applications, music, videos, television shows, and other media content. The game console may be coupled to a display, such as a television.

The companion devices 252, 254, 256, and 258 are computing devices. A companion device, as used in this application, is a personal computing device that provides a second display. Examples include laptops, PCs, netbooks, smartphones, e-readers, PDAs, and tablets. A companion experience allows the user to interact with content related to media playing on a primary device 210 through interfaces on the companion device. The companion experience may also allow the user to control the media presentation through an interface on the companion device.

The companion experience server 220 facilitates companion experiences by providing companion content, companion applications, registering and authenticating companion devices, facilitating communications between primary devices and companion devices, and performing other tasks. The companion experience server may be accessed via a wide-area network, such as the Internet.

The companion devices 252, 254, 256, and 258 may communicate directly with the primary device 210 via Bluetooth or through a wired connection. The companion devices could also communicate over a local wireless network generated by the wireless router 250. These connections could be direct or they could be routed through the companion experience server. The companion devices could also communicate with the primary device via a data service facilitated by base station 260. The base station 260 could route communications to the primary device through whatever communication to the Internet 230 the primary device is using. The base station 260 could also be in direct communication with the primary device, if the primary device is using the same data service.

Context-Specific Interface Engine

Figure 3:
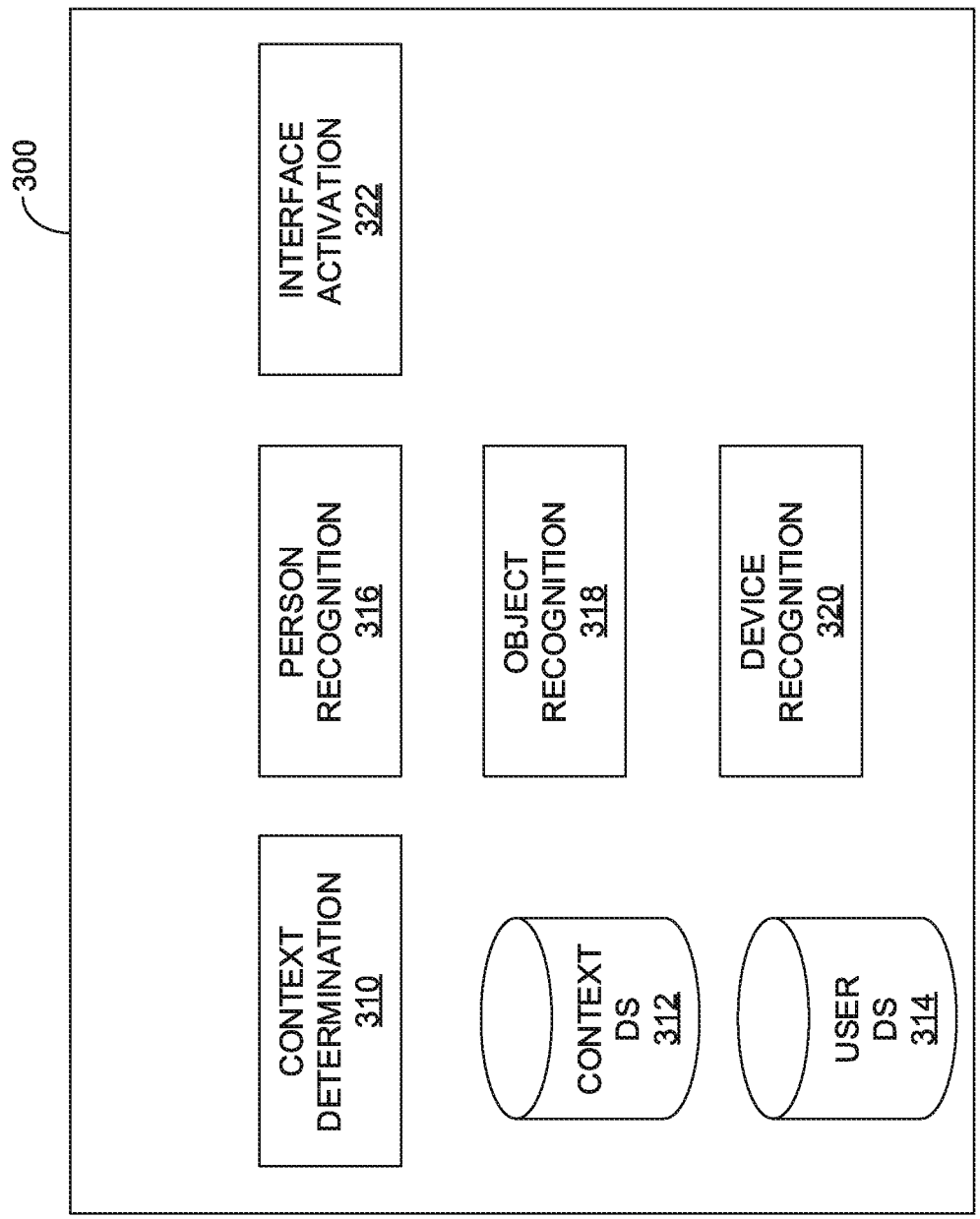
FIG. 3 is a diagram showing computing environment suitable for using an interaction context to optimize an user interface, in accordance with an embodiment of the present invention.

Turning now to FIG. 3, context-specific interface engine 300 with components suitable for detecting an interaction context and optimizing a user interface is shown, according to an embodiment of the present invention. The engine 300 includes a context determination component 310, a context data store 312, a user data store 314, a person recognition component 316, an object recognition component 318, a device recognition component 320, and an interface activation component 322. Context-specific interface engine 300 is merely an example of one suitable architecture and is not intended to suggest any limitation as to the scope of the use or functionality of the present invention. Neither should the context-specific interface engine 300 be interpreted as having any dependency or requirement related to any single component or combination of components illustrated therein. The context-specific interface engine 300 may reside on a single computing device or be distributed across multiple devices including multiple devices connected in a home area network, local area network, or wide area network. Parts of individual components may reside in part on a client and part on a server or otherwise be distributed across multiple devices.

The context determination component 310 determines the present interaction context of the user. The context comprises user actions and user interactions with devices, other people, and content currently being displayed on one or more devices. The context determination component 310 may use context templates to identify and label a context. A context template may describe characteristics of the context and recommend interface characteristics that are optimized for the context. The characteristics of the context are used to identify the present context. The recommended interface characteristics are those that are optimized or recommended for the context.

The context determination component 310 may be involved in building or optimizing context templates based on user actions observed while using the system. User's responses to optimized interfaces may be tracked and used to change context templates. For example, when a user does not interact with features added to an optimized interface, those features could be removed from the template. If users frequently navigate from a first interface feature to a second feature on a second interface, then the first and second interface features may be combined into a new optimized interface.

In one embodiment, data from user interactions with an interface may be communicated to server based machine learning and analysis that combine information from multiple users to create and modify templates. Templates could then be associated with similarly situated people and used to recognize interactions that indicate an user intention to interact with an interface in a particular manner. For example, context templates could be associated with 30-35 year old men that use a game pad with their right hand to navigate a media selection interface. The user characteristic could be observed, or gathered from account data, a corresponding template retrieved, and the interface optimized according to the template. Context templates may be stored in the server and accessed on demand or periodically communicated to a computing device.

For example, a gesture-input context template has gesture input as a characteristic. Gesture input occurs when a user motions with their body, or body parts, in a gesture that is recognized by an input device, such as a depth camera. For example, a user may perform a thumbs-up gesture intending to turn up the television volume. In any case, the context template may include context characteristics that include the user not holding a control device, or the user not appearing to interact with a control device being held, in addition to making recognizable gestures. In response, the optimized user interface features may include larger selectable objects. Accordingly, the user interface may be zoomed or selectable objects could be increased in size. In another embodiment, the selection area around objects are increased. Each context has different characteristics and optimized interface features. Some contexts may share characteristics with other contexts and optimized interface features.

Input mode is just one context feature. For example, there could be an entire class of gesture-based contexts including right-handed gestures, left-handed gestures, occluded gestures, and multi-person gestures. The context determination component 310 may use the input mode as a starting point to select a context class. As more information is received, the context may be updated and the interface adjusted accordingly. The interface may be dynamically updated as confidence in a contextual scenario increases or decreases. In general, a lower confidence in a particular context may result in display of more generic interface that is not optimized for a particular context but is adapted for use in different contexts.

Use of a dedicated device input is another context class. Dedicated devices include remote controls and game controllers and tend to be very specialized and less flexible. Characteristics that are used to determine that a dedicated device is being used include the user picking up a dedicated device and use of the dedicated device. This is in contrast to the device being put away or just relocated. In addition to using a camera to determine whether the user appears to be utilizing the device as a control mechanism, signals received from the dedicated device can confirm what is observed by the image data. In this case, the interface may be adapted or optimized for use with the selected dedicated device. The context determination component 310 may work with the device recognition component 320 to identify the particular dedicated device.

Companion interactions is another context class. Companion interaction involves the use of a companion device, such as a smart phone or tablet. Companion devices may have a touch screen that allows the user to make fine or granular selections and to view additional content. Companion devices may also have a hard or soft keyboard that allow the user to input text. Characteristics of companion device interaction include picking up a companion device. A companion device may be identified by its appearance and by signal data received by the device. For example, data packets communicated from a companion device during set up of a communication session may include a URL that identifies the device and device characteristics.

In one embodiment, the person recognition component 316 is used to associate individual devices with people. For example, multiple people may be in the room with multiple devices. The person recognition component 316 can help determine who is doing what with their device. For example, a first person may be associated with a device that is sitting on the table being ignored. In this case, the user interface would not want to push relevant content to this person's companion device or move to an interface context that is optimized for control by a companion device. On the other hand, if a second person is viewing his/her companion device, supplemental content could be pushed to the device to enhance or augment the second person's viewing experience or ability to control an interface if desired.

Embodiments of the present invention attempt to anticipate that the user will want to use a companion device as part of the interface interaction. For example, a user that is attempting to navigate a web browser interface using gestures may pick up a companion device shortly after selecting a textbox. Embodiments of the present invention may automatically open the soft keyboard on the companion device to allow the user to type using the companion device. This optimization would occur without the user doing anything else other than picking up the companion device or, if they are already holding it, moving it in a way that indicates they are preparing to use it. The context in this case also takes into account the state of the browser application. In this case, the context includes an active textbox. If the user was not holding the companion device, the soft keyboard would not be opened and a gesture keyboard on the main display could be opened instead.

An audio context is another context class where an interface may be optimized. For example, it may be difficult to differentiate between people talking in the room and a person wanting to begin to use audio commands to control an interface. In one embodiment, the audio interface is turned on upon detecting that a user that is directly interacting with the interface using voice commands. The user's attention to the interface may be determined by image data that confirms the user is viewing the interface, in contrast to speaking with other people. The presence of other people in the room may also help determine the context. For example, people may be less likely to speak to themselves and any spoken words could turn on the audio recognition system when a single person is in the room. In contrast, with multiple people in the room it may be undesirable to turn the audio recognition system on without a more explicit command from the user.

In addition to optimizing the visual appearance of the interface, an entirely new interface may be presented upon determining a context. For example, if a user is interacting with a web browser using gestures and then picks up a game controller, a contextual determination may be made that the user wants to play a game rather than interact with the web browser using the game controller. In this case, instead of optimizing the web browser for use with a game controller, a game home page or other gaming-related interface could be presented. In one embodiment, the user is automatically brought to their last-played game.

The context determination component 310 may utilize one or more machine learning algorithms to recognize contextual situations and associate them with an appropriate context template. In particular, the context determination component 310 may input various user characteristics stored in user data store 314 to help identify the context that is appropriate. In this way, a user's past behavior and preferences can be incorporated into the context determination process.

The context data store 312 stores context characteristics and additional information. The context characteristics may be determined or stored as context templates. In one embodiment, context usage for a user is stored in the context data store 312. In other words, the most commonly used contexts may be ascertained for a particular user and used in the future to disambiguate a context determination. The context data store 312 may reside on a single computing device or be distributed across multiple devices including multiple devices connected in a home area network, local area network, or wide area network. Data associated with the context data store 312 may reside in part on a client and part on a server or otherwise be distributed across multiple devices.

The object recognition component 318 uses image data to recognize inanimate objects in the room. This is in contrast to people which are recognized using person recognition component 316. Object recognition component 318 may recognize game objects or other objects of particular interest to determining a present context. For example, object recognition component 318 may recognize a game object such as a tennis racket or wizard's hat. Upon recognizing a tennis racket, a tennis game may be immediately opened in a mode where the user can play using the racket. In the wizard hat example, the embodiments of the present invention may select the user's favorite game that includes a wizard and select the character based on the hat. In games with different characters, different prominent pieces of clothing or game paraphernalia may be used as a cue to automatically open that game or select a particular character.

In another embodiment, the object recognition component 318 recognizes various objects that the user is interacting with and establishes an appropriate context. For example, a user drinking a cola with the user's right hand may want to make gestures with the left hand and not put the cola down. In this case, the gesture interface may be optimized for use with the left hand.

A device recognition component 320 recognizes control input devices, including dedicated devices and companion devices. The different devices are recognized using image data, similar to that used by object recognition component 318, but may also utilize signal data received from the companion devices and dedicated devices. Signal data may be used in combination with camera data to identify a particular device within the environment. For example, several game controllers may look alike. However, using camera data that shows the user's interaction, such as pushing buttons or moving the joystick, the particular controller may be identified by correlating the image and control data. In one embodiment, the person recognition component 316 is utilized to associate a particular person or user with a particular device. In this way, players could be taken to their last progress point, or game state, by simply picking up the controller.

With companion devices, login data and other user characteristics may also be evaluated to associate the device with a particular person or player with an account on a primary device. Additionally, like the game controller, observed user interactions with a device may be synchronized with control data received from the device to place the device within the environment and with a particular person.

The interface activation component 322 activates the appropriate interface for a context determined by context determination component 310. In one embodiment, the interface activation component 322 communicates with the active application, where appropriate, and provides new interface settings that should be used in the context. The interface settings may be drawn from a context template.

Contextual Interfaces

Figure 4:
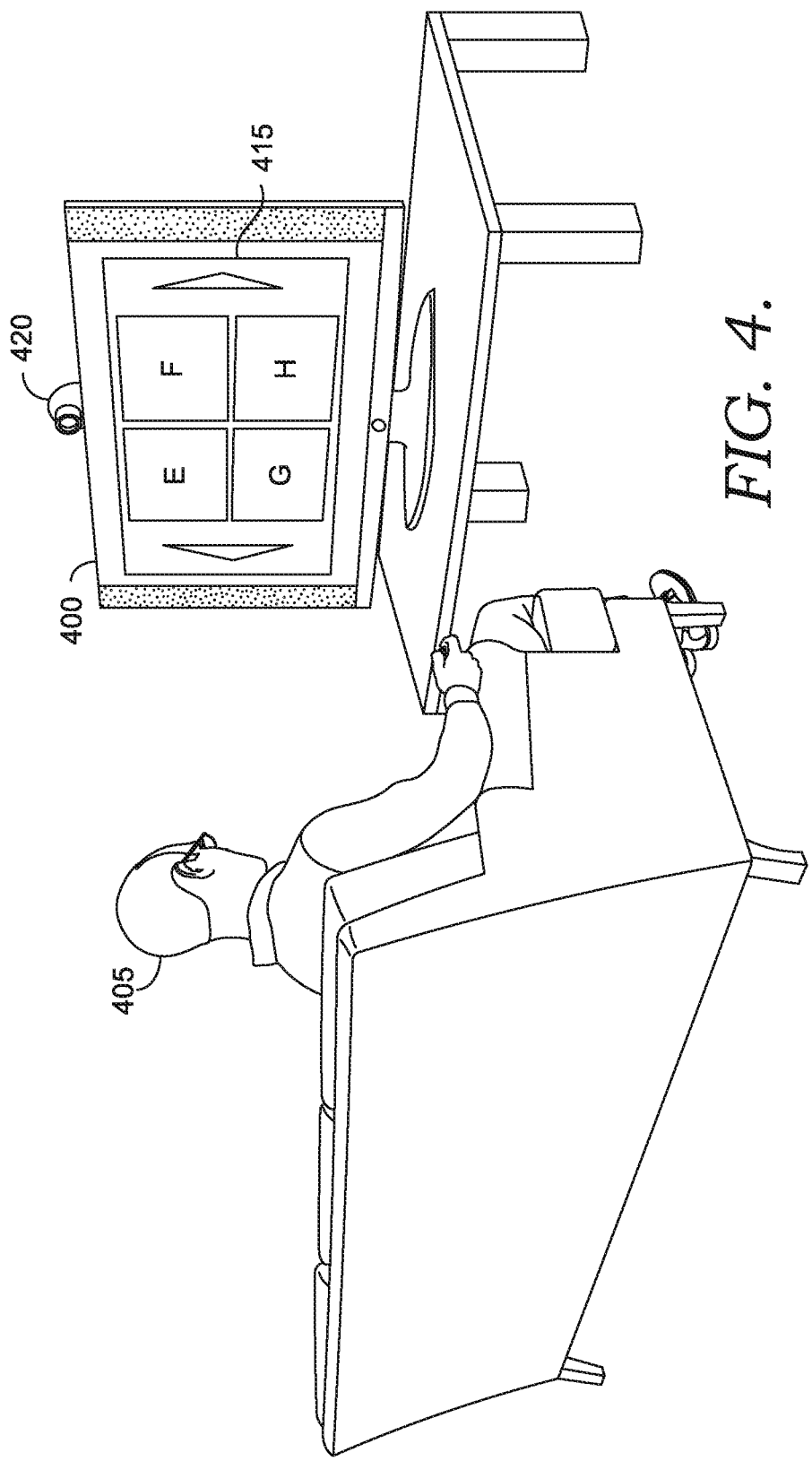
FIG. 4 is a diagram showing a user interacting with interface optimized for using gestures, in accordance with an embodiment of the present invention.
Figure 5:
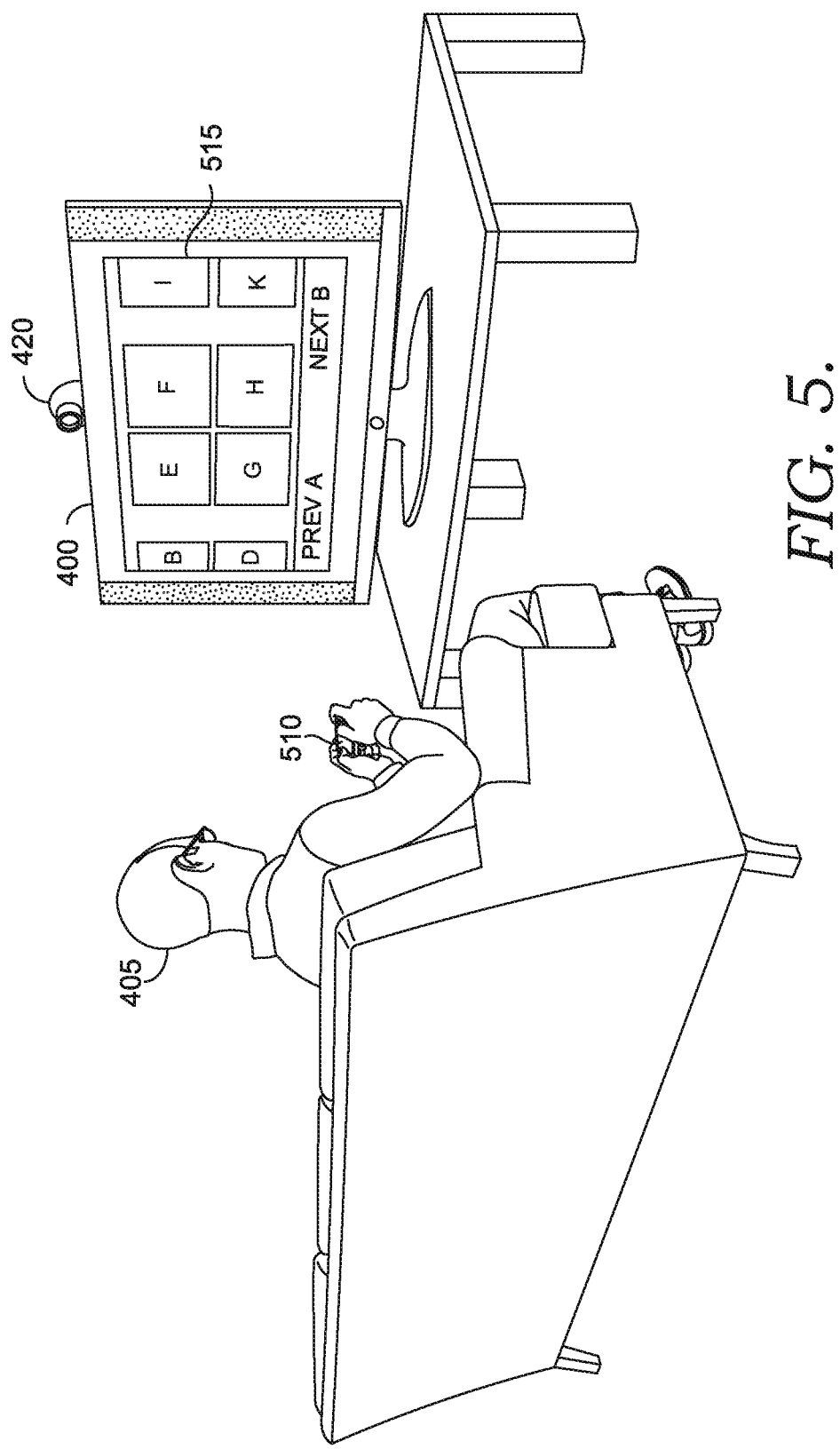
FIG. 5 is a diagram showing a user interacting with a interface that is automatically optimized for use with a companion device that is recognized by the game console, in accordance with an embodiment of the present invention.

FIGS. 4 and 5 illustrate an embodiment of the invention that automatically optimizes an interface based detecting a change in the user's method of interaction with content. The user's interaction method is an example of context. Different interfaces may be optimized depending on the input mechanism employed by the user to interact with the interface. For example, an optimized gesture interface, such as provided by a depth camera, includes large buttons and other large interface objects. In contrast, a touch screen, joystick, push buttons, or other controller, that provides more granular control may be able to show more information and smaller interactive objects.

FIG. 4 depicts a user 405 sitting on their couch interacting with an interface 415 displayed on display device 400. The input mechanism is a gesture interface with a performance area captured by camera 410. The 405 user makes gestures with their hand, feet, entire body, or a combination to manipulate the interface objects, such as boxes E, F, G, and H.

FIG. 5 shows a similar scene except that the user 405 has picked up a game controller 510. Embodiments of the present invention are not limited to a game controller. The user could pick up a companion device such as a tablet or smartphone. As can be seen, the new interface 515 provides additional options that are compatible with the game controller 510. For example, the user can scroll horizontally by pushing the controllers A or B buttons. In addition, the boxes E, F, G, and H are smaller because they will be easier to select with the controller, which allows the user to manipulate a selector or cursor with a joystick or up and down arrows.

Embodiments of this invention involve two steps. The first step is detecting that the user has changed their interface interaction method. For example, when the user switches from gestures to a controller the active context may be updated. The second step is to update the user interface to accommodate the new method of input. Several different detection methods may be used. For example, a camera may be used to actively track a user and observe what input method they are presently using. In one example, a depth camera may be used to identify and track a user's input or interaction method. A vision based system may be used to detect specific markers on the input device to determine whether it is a tablet, smart phone, TV remote, or game controller.

The system will also determine the type of device that the user is holding. An algorithm, for example, a machine learning depth shape detector, may be used to determine the type of device held by the user. Potentially, a series of unique markers or internal sensors are put in, or on, the device in order for the system to better distinguish the device. Other markers could be added to help the system effectively distinguish between two identical devices, such as two game controllers. Different devices may generate different gyroscope or accelerometer output because of the number and location of the sensors within an input device. This output can form a pattern. A reading of internal sensors, such as a gyroscope, within a device picked up by a user may be correlated to a library of known patterns and used to determine the exact external input device held by the user.

The detection could also take place by evaluating device identification information within radio signals transmitted by a device. The opening of a communication session between a controller, or other device, and the computing device controlling the user interface may also include device identifying information. For example, as described previously, a companion device may connect to a game console. Upon this connection, the game console and companion device are able to communicate. This connection may be open even though the user is not actively using the companion device. Thus, the depth camera could detect that the user has transitioned away from a gesture interface when the user picks up a companion device.

The camera could make a broad determination that the user has picked up a device that conforms with one or more companion devices that have open communication sessions with the user. The camera could then correlate inputs received from the device with movements detected. For example, the camera could determine that the user was touching the touch screen on the companion device at the same time touch screen input was received through the open connection. At this point, a definitive determination could be made that the user has transitioned to the specific companion device input experience. Upon making the determination, the user interface could be transitioned to one optimized for interaction with the companion device.

Regardless of the exact method used to detect the companion device, the next step is changing the user interface. Once the system has determined that the user is engaging with a new input device, the UI is notified and updated accordingly to reflect the new input. For example, when a user is watching a movie on a device that supports gesture controls and voice controls, they may use their voice and hand gestures to navigate the user interface. If they get bored watching the film and decide to pick up the controller to play something instead, the context change is detected. Once the system detects they have picked up the controller, a controller-navigable user interface appears, allowing them to launch a set of controller-based games.

In another example, a user is playing a game that is primarily controlled with a controller, but has a secondary device, such as a tablet, that displays additional information. While interacting with the title, the user picks up the tablet, and the title automatically switches to a display that augments the tablet experience, such as a map, or an item management screen. This example shows that the user interface may transition in a way that is both optimized in terms of size or controls available as well as generating a totally different interface with different content based on a task that is likely to be performed when the user picks up the new controller. Thus, the UI may be optimized based on input device capability and likely tasks performed with the device. The user's history of controller and device usage may be analyzed to determine the optimal user interface.

Figure 6:
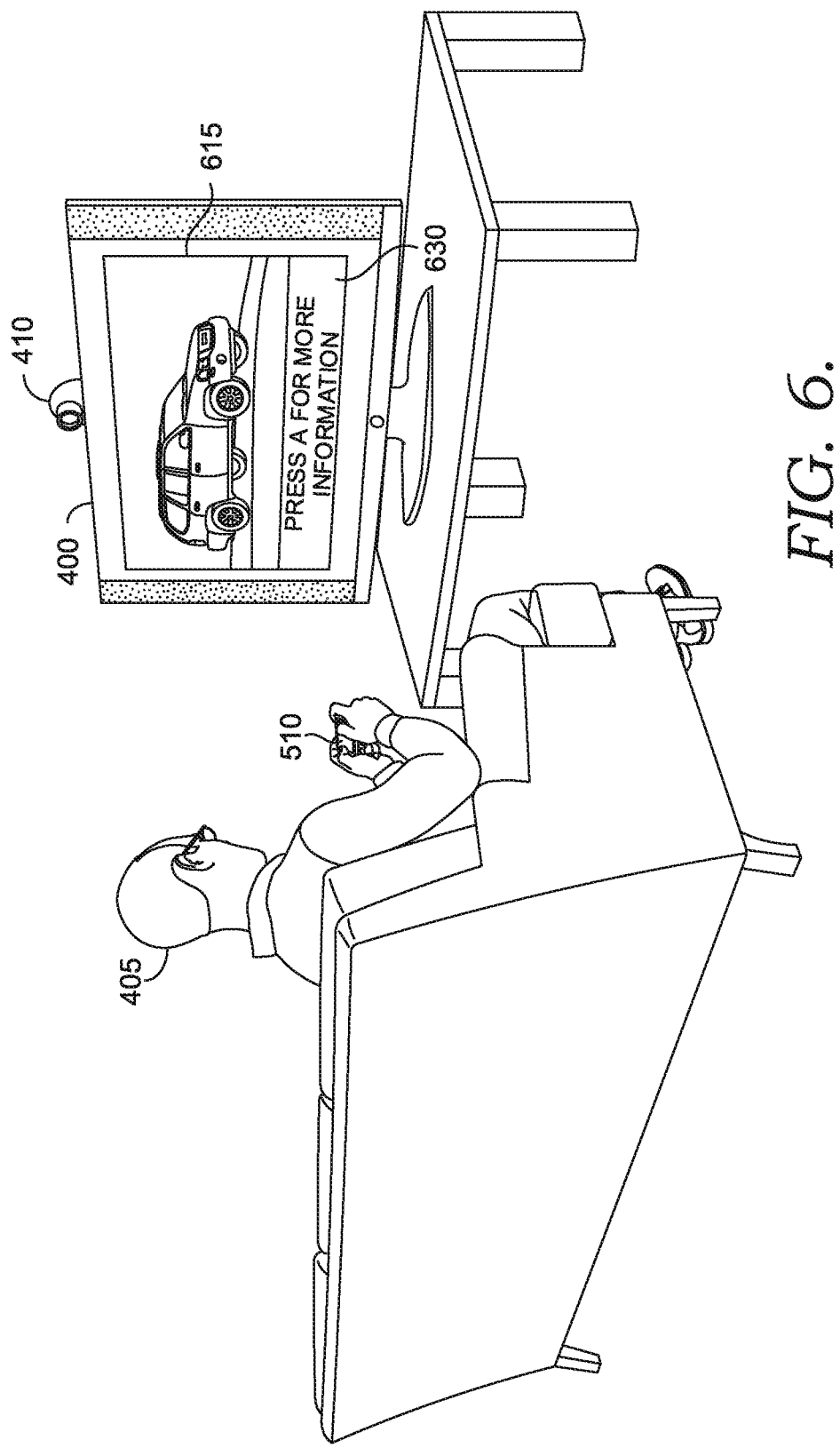
FIG. 6 is a diagram showing a user interacting with a help interface optimized for use with a game controller, in accordance with an embodiment of the present invention.
Figure 7:
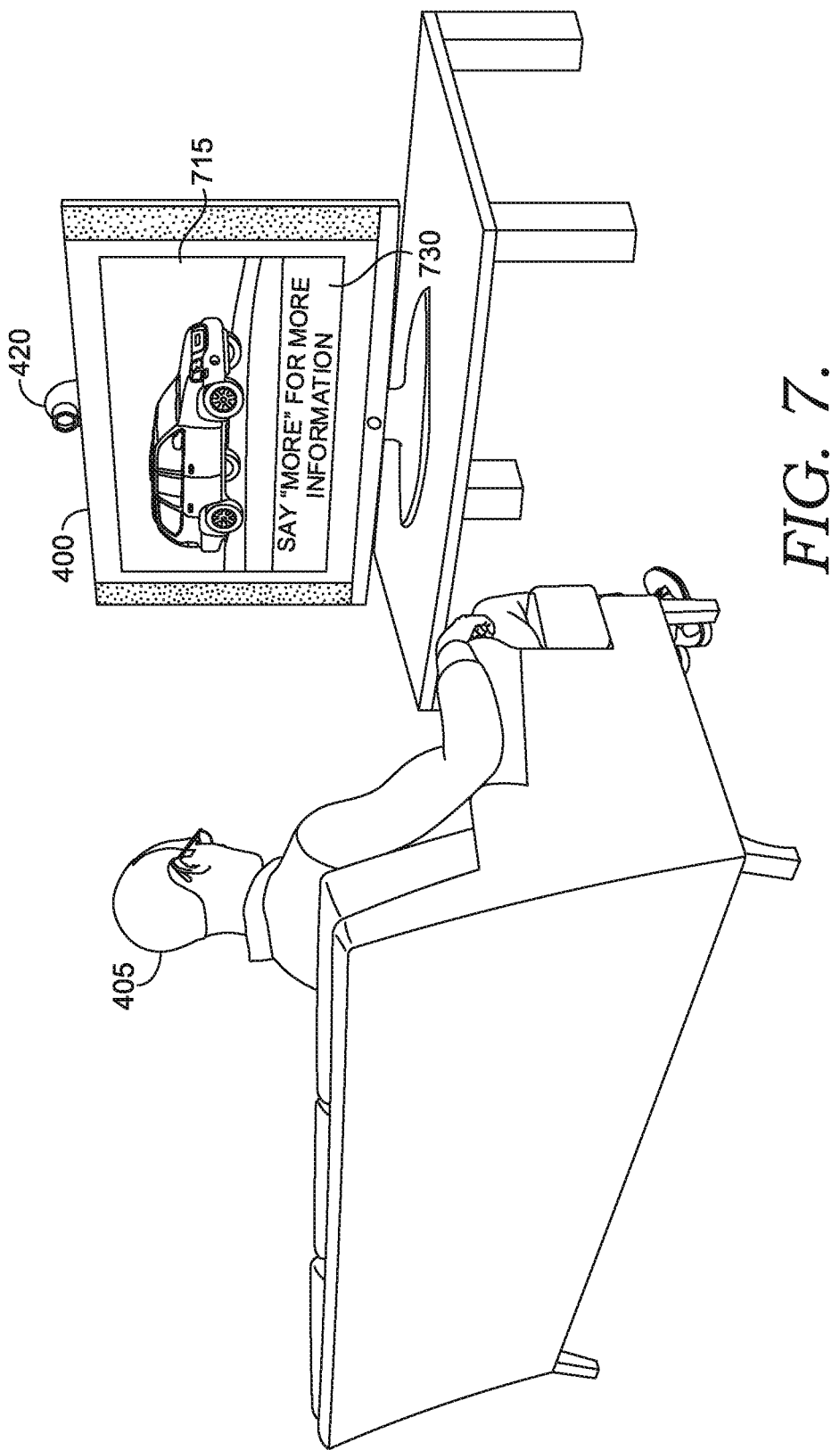
FIG. 7 is a diagram showing a user interacting with a help interface optimized for use with audio control, in accordance with an embodiment of the present invention.
Figure 8:
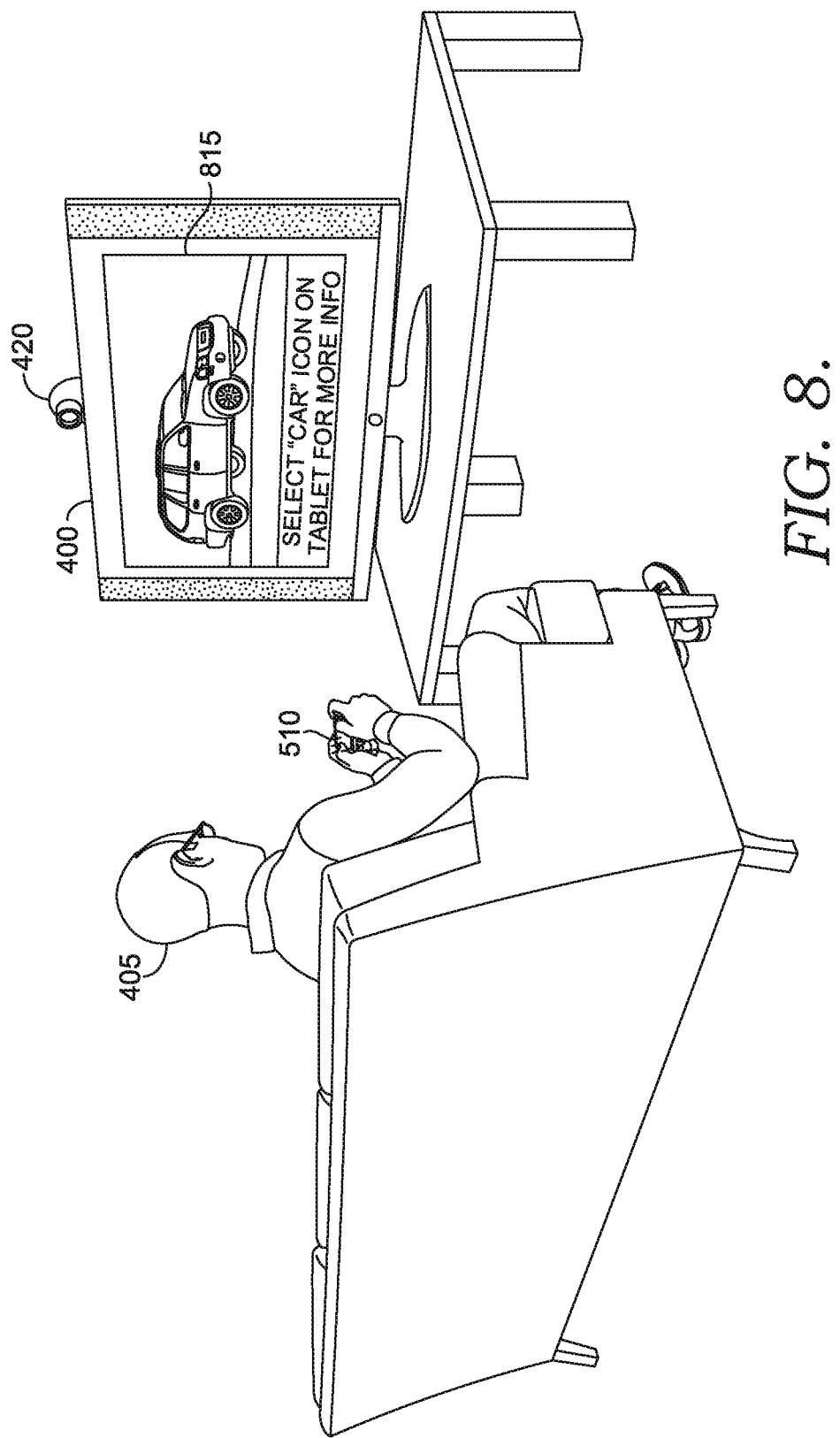
FIG. 8 is a diagram showing a user interacting with a help interface optimized for use with a companion device, in accordance with an embodiment of the present invention.

FIGS. 6, 7 and 8 illustrate help interfaces that are optimized to interact with different inputs. As mentioned, inputs are characteristics of a context for which interfaces are optimized.

FIG. 6 describes a help interface that is optimized for a game controller 510, in accordance with an embodiment of the present invention. As can be seen, a user 405 is attempting to interact with interface 615 using game controller 510. The active input mechanism may be ascertained through a combination of image data gathered by camera 410 and from signal data received from game controller 510. As can be seen, the interface 615 includes a help message 630 that states "press A for more information." "A" describes a label with a button on the game controller 510. The user may access a menu or a different interface by pressing A in the particular context. The overall media presentation shown in interface 615 may not change from context to context. For example, if the car shown is a commercial or part of a movie then its appearance may stay the same from context to context. The help overlay and other interactive features of the interface 615 may change with context.

Turning now to FIG. 7, a help interface optimized for audio control is shown, in accordance with an embodiment of the present invention. The features of FIG. 7 are similar to those described previously with reference to FIG. 6. However, notice that the user 405 is no longer holding a controller. Though not shown, the user may be speaking commands to indicate that an audible interface should be activated. The interface 715 includes a help interface 730 that states "say 'more' for more information." In an optimized audio mode, various audio commands that are available to the user may be suggested based on the task the user appears to be completing.

Turning now to FIG. 8, a help interface or overlay that is optimized for use with a companion device is shown, in accordance with an embodiment of the present invention. Interface 815 is similar to the interface described previously with reference to FIGS. 6 and 7 but includes a help overlay that states, "Select 'car' icon on tablet for more information." This message refers to an icon presently being displayed on the user's companion device 810. This help overlay takes into account not only what type of device the user is attempting to use to control the interface, but also content presently displayed on the device. Contextual interfaces may be built by exchanging state information between applications running on the companion device 810 and on the device generating the interface 815.

The camera 410 may be used to determine that the user is actually holding the companion device 810 and willing to use it as a control mechanism before the interface is changed to be optimized for use with the companion device 810. For example, were the companion device 810 is sitting on the table, the context could be different than when held by a user.

Figure 9:
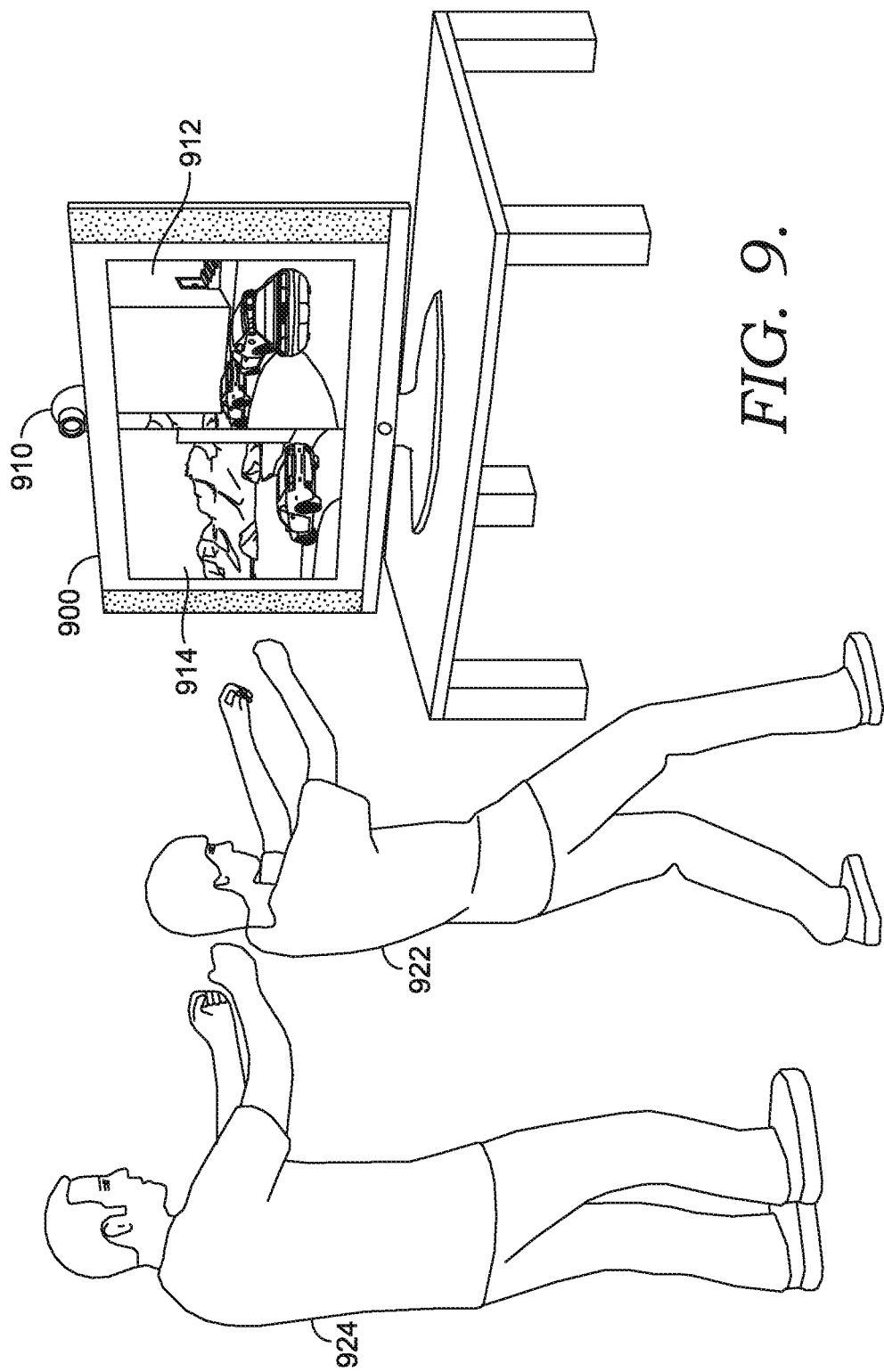
FIG. 9 is a diagram showing a user interacting with an interface optimized for left handed gestures, in accordance with an embodiment of the present invention.

Turning now to FIG. 9, a contextual interface that is optimized based on a person's location within a game environment is shown, in accordance with an embodiment of the present invention. FIG. 9 includes players 924 and 922 playing a video game that is displayed on display device 900. Display device 900 may be a television. Each player is associated with their own split screen interface. Player 922 is associated with split screen interface 912 and player 924 is associated with interface 914.

Camera 910 may be a depth camera, or other device capable of generating data that may be used to recognize people and objects. The arrows indicate that the split screen interfaces 912 and 914 may switch places if the players 922 and 924 switch places. This transition can take place automatically upon determining that the context has changed. In this case, the changing context is the changing location of the two players. In this way, the players are always exposed to a direct view of the split screen interface with which they are interacting regardless of their movements.

In addition to transitioning during game play between different interface locations, the initial setup may be optimized before game play by doing person recognition and understanding which person is associated with which user file in the game. Though not shown, players 922 and 924 could be using game controllers or companion devices to interact with the video game. In another embodiment, they are using gestures for audio control to play the video game. Regardless, their relative location may be identified and the interface optimized accordingly.

Figure 10:
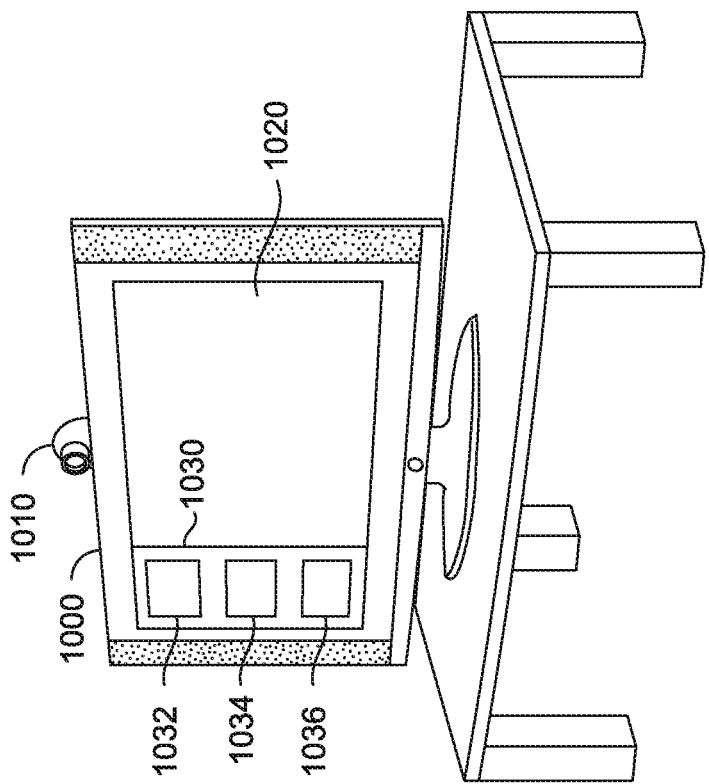
FIG. 10 is a diagram showing a user interacting with an interface optimized for right handed gestures, in accordance with an embodiment of the present invention.
Figure 10:
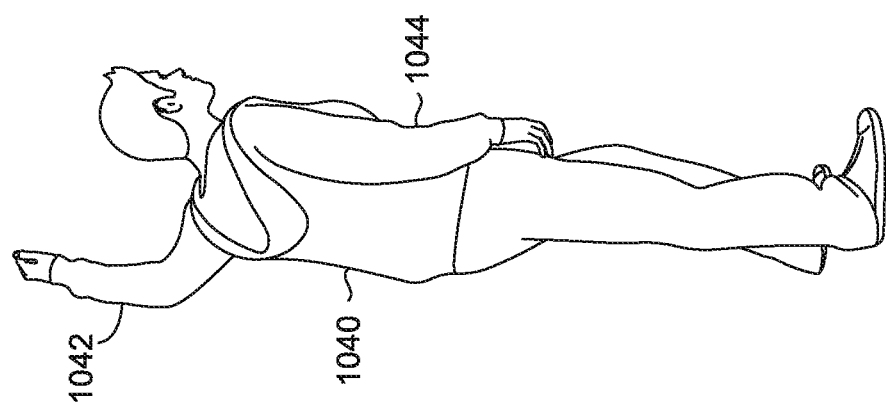
Figure 11:
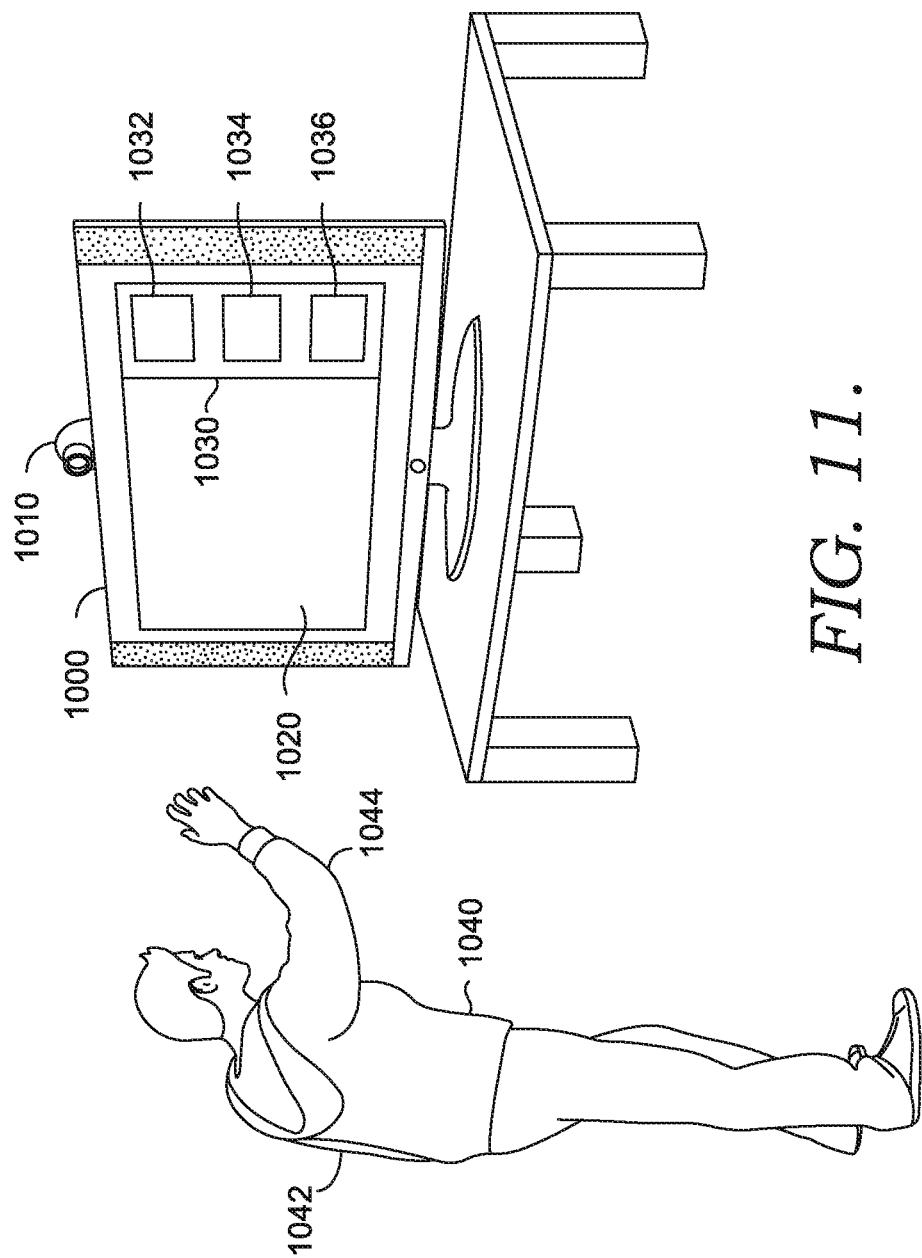
FIG. 11 is a diagram showing a user interacting with an interface optimized as a result of an object handled by the user, in accordance with an embodiment of the present invention.

Turning now to FIG. 10 and FIG. 11, user interfaces optimized for right-handed or left-handed use are shown, in accordance with an embodiment of the present invention. FIG. 10 shows a person 1040 watching content shown on display device 1000. The content includes a primary display 1020 and a supplemental content window 1030. The supplemental content window 1030 includes selectable object 1032, selectable object 1034, and selectable object 1036. Icons and buttons are examples of selectable objects. The camera 1010 is able to capture data that is used to identify people and objects. Additionally, the information may be used to determine a person's movements, such as those associated with gestures. In this case, the interface, which has the selectable buttons on the left, is optimized for use with the left-handed gestures. As can be seen, the player 940 is raising their left hand 1042 to make a gesture.

A user's right or left-handed preference may be ascertained a number of different ways. In one embodiment, the user's history is analyzed to ascertain their right or left-handed preference. User's that are known to be right or left-handed, or to use their right or left hand most frequently when gesturing, will be automatically presented with an optimized interface for their hand of preference.

In addition to previous use, the current user situation may be evaluated to determine which hand the user is likely to use. In one embodiment, a user is deemed not likely to use a hand that is being put to a different use currently. For example, if the hand is the right hand holding a glass, a phone, or is in a pocket, then the presumption may be made that the user wishes to use the left-hand and a left-handed optimized interface is presented. The context template associated with right or left-handedness may look at a number of factors, to determine which hand the user is likely to use.

Turning now to FIG. 11, the same interface shown in FIG. 10 is shown, except that it is now optimized for right-hand use. As can be seen, the user 1040 has their right-hand 1044 raised and is using it to interact with the display. In one example, in a right or left-handed interface is presented in anticipation of a user's gestures interfering with another person. For example, if it appears from the image data that a user would have to place their right-hand in front of another person's face to make a gesture with their right hand, then a left-handed interface may be presented to encourage the user to use their left-hand. In another embodiment, if it appears that the user's right hand would be blocked from view of the camera 1010 by another person or object standing in front of their right hand, then a left-handed interface would again be presented to encourage use of the left-hand and avoid the occlusion problem created by the interfering object. In this way, the contextual determination can attempt to avoid a problem by creating an interface that is optimized to avoid problems detected in the environmental context.

Figure 12:
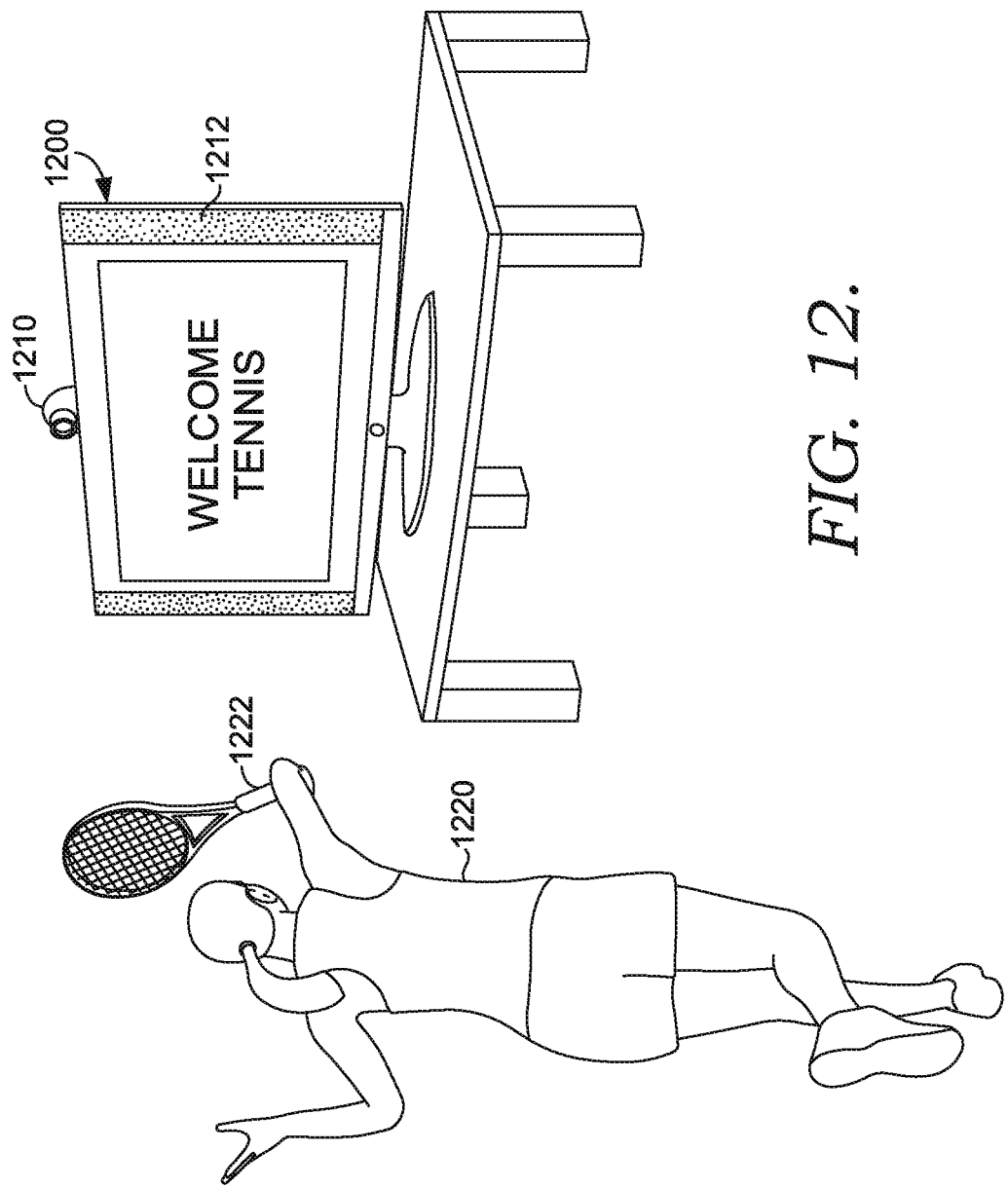
FIG. 12 is a diagram illustrating using the identification of an object or clothing within the environment to generate a corresponding interface, in accordance with an embodiment of the present invention.

Turning now to FIG. 12, the identification of an object or clothing within the environment to generate a corresponding interface is illustrated, in accordance with an embodiment of the present invention. In FIG. 12, user 1220 holds up a tennis racket 1222 in front of display device 1200 and camera 1210. The camera 1210 captures image data that is used to recognize the tennis racket 1222 and perhaps the person 1220. In response, a tennis game is automatically shown in interface 1212. This prevents the user from needing to navigate through various interfaces to play a virtual tennis game, which may be the most likely reason for the user to show up in front of the interface with a tennis racket 1122. Alternatively, the tennis racquet could be used as a cue that the person 1220 wants to watch tennis. User preferences and viewing history may be used to disambiguate the context.

In another embodiment, articles of clothing are recognized and used to establish a context and present an appropriate interface. In one embodiment, a team jersey is recognized and used to automatically select a similar color jersey or even the exact same team within a video game. For example, a video game having NFL teams may be started with the user playing their team indicated on their jersey. In a multiple player setting, multiple people could be assigned teams corresponding with their jerseys. When an exact match is not possible, similar colors may be assigned automatically to the team they are controlling.

Depending on other contextual factors, such as an ongoing sporting event involving the team identified from the clothing, the presentation of that sporting event may automatically be presented on the user interface. For example, if a football game involving the team indicated on a person's jersey is presently available, then it may be shown. If the game is ongoing, but is not presently available because of the user's cable package, for example, a mechanism for viewing the game, such as subscribing to a particular cable package may be presented to the user and automatically set up. Alternatively, a web page showing a game update may be displayed automatically.

Disambiguating the play video game vs. watch game contexts, may hinge on whether there is a sporting event available involving the relevant team. Thus, contextual factors may include more than just what is going on in the present environment, but may include evaluation of various content that may be of interest to the user or available to the user at a particular time. When multiple contexts are available, a user's previous viewing history may be considered to help disambiguate the selection. The user may also be presented with alternative interfaces. For example, the user could be asked whether they want to watch their team play the ongoing contest or play a video game.

In another embodiment, clothing associated with various video games may be used to automatically choose characters or various available games. For example, a person wearing a wizard hat may be automatically assigned the wizard character as they start a game involving a wizard. In a slight variation, in response to wearing the wizard hat, a game involving a wizard may be opened without selecting a particular character. When multiple games involving a wizard are available, the most recently played game involving a wizard may be selected and presented.

Methods for Generating Contextual Interfaces

Figure 13:
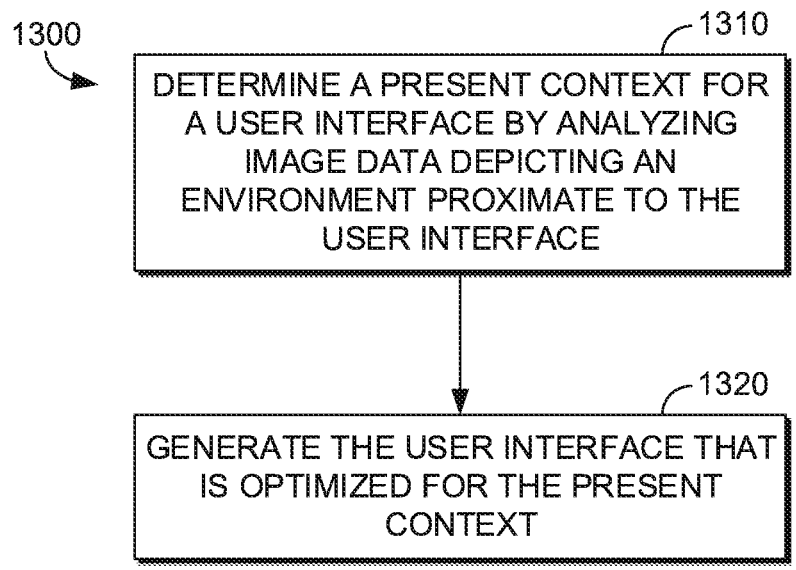
FIG. 13 is a flowchart showing a method of presenting an interface that is optimized for a present context, in accordance with an embodiment of the present invention.

Turning now to FIG. 13, a method of presenting an interface that is optimized for the present context is shown, in accordance with an embodiment of the present invention.

The interface of method 1300 may be a computer interface displayed on a television, monitor, or other display device. The interface may be generated by game console, media player, personal computer, or other similar device.

At step 1310, a present context for a user interface is determined by analyzing image data depicting an environment proximate to the user interface. In one embodiment, the environment proximate to the user interface is the volume of space depicted in the image data. In another embodiment, the environment extends behind the area captured by the image data and is demarked by physical boundaries such as those in a room or a residence such as a house or apartment. Though these other areas may not be in view of a camera that captures the image data, signals from devices in the environment may be received as well as audible commands from users that are not in view of a camera. In one embodiment, the image data is three-dimensional image data, such as that captured by a depth camera. The image data may be described as a depth cloud. The three-dimensional data allows the size, shape, and motion of objects to be detected within the data. The depth cloud may be used to recognize gestures made by a user. A gesture may be a hand movement, body movement, facial expression, or other action recognized by a gesture interpretation component to control an interface.

At step 1320, a user interface that is optimized through a present context is generated. The user interface is output for display to the user. Various ways of optimizing a user interface have been described previously. For example, user interface may be optimized for use with a particular control mode. Within the various control modes, the task the user is intending to complete through the interface may be anticipated and the user interface updated accordingly. The intended task is part of the context that is derived from evaluating the environment. User interactions with objects in the environment may also be used to determine the context.

Figure 14:
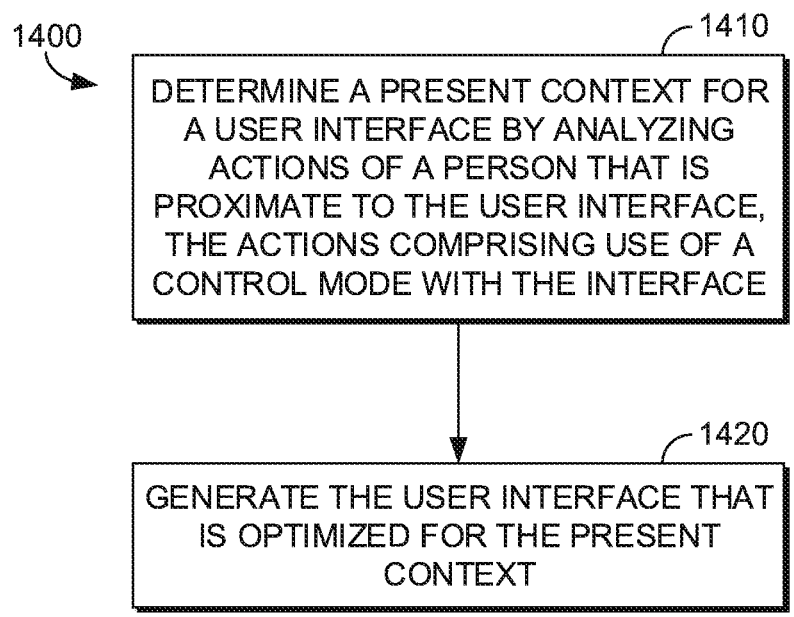
FIG. 14 is a flowchart showing a method of presenting an interface that is optimized for a present context, in accordance with an embodiment of the present invention.

Turning now to FIG. 14, a method 1400 of presenting an interface is optimized to the present context is shown, in accordance with an embodiment of the present invention. At step 1410, a present context for a user interface is determined by analyzing actions of a person that is proximate to the user interface. The actions comprise use of a control mode with the interface. Exemplary control modes include using gestures, using a companion device, using a dedicated device, and audible control. The present context may be more granular than a particular control mode. For example, within a gesture control mode, the context may determine that right-handed gestures or left-handed gestures are preferable.

At step 1420, a user interface that is optimized to the present context is generated. The user interface is output for display to the user. Methods of optimizing the user interface in view of the present context have been described previously.

Figure 15:
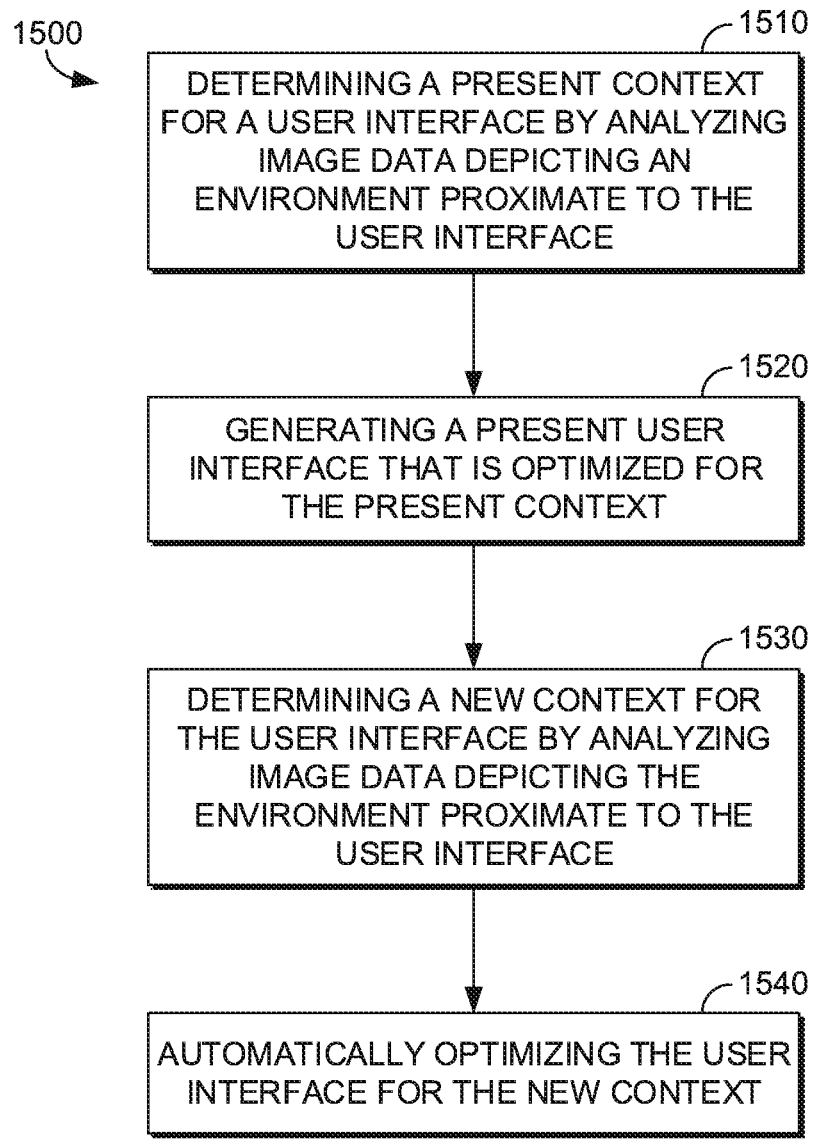
FIG. 15 is a flowchart showing a method of presenting an interface that is optimized for a present context, in accordance with an embodiment of the present invention.

Turning now to FIG. 15, a method 1500 of presenting an interface that is optimized to the present context is shown, in accordance with an embodiment of the present invention. At step 1510, a present context for a user interface is determined by analyzing image data depicting an environment proximate to the user interface. Present contexts and the use of image data to determine the present context have been described previously with reference to FIG. 13 and elsewhere.

At step 1520, a present user interface that is optimized to the present context is generated. The present user interface is output for display to the user.

At step 1530, a new context for the user interface is determined by analyzing image data depicting the environment proximate to the user interface. The image data depicts changes to the environment that result in the new context. At step 1540, the user interface is automatically optimized for the new context.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer executable instructions embodied thereon, which when executed by a computing device, causes the computing device to perform a method of presenting an interface that is optimized for a present context, the method comprising:
    determining a present context by analyzing actions of a person comprising holding a game object;
    generating a user interface of a video game application associated with the game object that is optimized for the present context, wherein input for the user interface is received using the game object;
    upon receiving a hand gesture, identifying a new context; and
    in response to identifying the new context, automatically adapting the user interface for gesture input.

2. The media of claim 1, wherein the actions are determined by analyzing image data of the person.

3. The media of claim 1, wherein the method further comprises automatically re-optimizing the user interface upon determining a new context for the interface.

4. The media of claim 1, wherein the actions comprise use of a left hand to hold the game object and the user interface is optimized for use with left handed input.

5. The media of claim 1, wherein the game object is a tennis racquet and the video game is a tennis game.

6. The media of claim 1, wherein the game object is a piece of clothing worn by the person.

7. The media of claim 1, wherein automatically adapting the user interface comprises increasing a size of a control input for gesture interaction.

8. The media of claim 1, wherein automatically adapting the user interface comprises generating a new interface that is different than the generated user interface of the video game application.

9. A method of presenting an interface that is optimized for a present context, the method comprising:
    determining a present context by analyzing actions of a person comprising holding a game object;
    generating a user interface of a video game application associated with the game object that is optimized for the present context, wherein input for the user interface is received using the game object;
    upon receiving an action comprising a hand gesture, identifying a context different from the present context; and
    in response to identifying the new context, automatically adapting the user interface for gesture input.

10. The method of claim 9, wherein the actions are determined by analyzing image data of the person.

11. The method of claim 9, wherein the method further comprises automatically re-optimizing the user interface upon determining a new context for the interface.

12. The method of claim 9, wherein the actions comprise use of a left hand to hold the game object and the user interface is optimized for use with left handed input.

13. The method of claim 9, wherein the game object is a tennis racquet and the video game is a tennis game.

14. The method of claim 9, wherein the game object is a piece of clothing worn by the person.

15. The method of claim 10, wherein the method further comprises:
   determining another new context for the user interface by analyzing image data depicting an environment of the person and signal data received from a companion device indicating the companion device is wirelessly connected to the computing system, the image data indicating that the user has picked up the companion device; and
   automatically optimizing the user interface for the another new context by changing the user interface to enable control by the companion device.

16. A computing system comprising:
   a processor; and
   computer storage memory having computer-executable instructions stored thereon which, when executed by the processor, implement a method of presenting an interface that is optimized for a present context, the method comprising:
      determining a present context by analyzing actions of a person comprising holding a game object;
      generating a user interface of a video game application associated with the game object that is optimized for the present context, wherein input for the user interface is received using the game object;
      determining a new context for the video game application based on identifying a hand gesture; and
      in response to determining the new context, automatically changing the user interface for gesture input.

17. The system of claim 16, wherein the method further comprises:
   determining another new context for the user interface by analyzing image data depicting an environment of the person and signal data received from a companion device indicating the companion device is wirelessly connected to the computing system, the image data indicating that the user has picked up the companion device; and
   automatically optimizing the user interface for the another new context by changing the user interface to enable control by the companion device.

18. The system of claim 17, wherein the new context is disambiguated from multiple possible contexts using previous user interactions with the user interface.

19. The system of claim 17, wherein determining the present context comprises determining a control mode utilized by a user to interact with the user interface.

20. The system of claim 16, wherein the actions comprise use of a left hand to hold the game object and the user interface is optimized for use with left handed input.

* * * * *